United States Patent
Dourra et al.

(10) Patent No.: US 8,974,345 B2
(45) Date of Patent: Mar. 10, 2015

(54) DOUBLE SWAP KICKDOWN SHIFT CONTROL

(75) Inventors: Hussein Dourra, Bloomfield, MI (US); Javed Dada, Lapeer, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 306 days.

(21) Appl. No.: 13/588,237

(22) Filed: Aug. 17, 2012

(65) Prior Publication Data

US 2014/0051543 A1 Feb. 20, 2014

(51) Int. Cl.
*F16H 3/44* (2006.01)
*F16H 61/06* (2006.01)
*F16H 61/08* (2006.01)

(52) U.S. Cl.
USPC .............. 477/74; 477/172; 477/180; 475/281

(58) Field of Classification Search
USPC ................. 475/275, 281, 286, 287, 311, 312; 477/71, 74, 94, 172, 180; 74/331
See application file for complete search history.

(56) References Cited

U.S. PATENT DOCUMENTS

| 5,697,864 | A | 12/1997 | Watanabe |
| 7,179,189 | B2 | 2/2007 | Dourra et al. |
| 7,608,013 | B2 | 10/2009 | Chen |
| 7,632,215 | B2 | 12/2009 | Dourra et al. |
| 7,789,798 | B2 | 9/2010 | Chen |
| 7,894,496 | B2 | 2/2011 | Hackel et al. |
| 8,167,755 | B2 * | 5/2012 | Martin et al. ................. 475/276 |
| 2005/0107212 | A1 | 5/2005 | Soliman et al. |
| 2008/0132375 | A1 | 6/2008 | Dourra et al. |

FOREIGN PATENT DOCUMENTS

EP 1906061 A2 4/2008

OTHER PUBLICATIONS

International Search Report and Written Opinion dated Nov. 5, 2013 for International Application No. PCT/US2013/052531, International Filing Date Jul. 29, 2013.

* cited by examiner

*Primary Examiner* — Jacob S Scott
(74) *Attorney, Agent, or Firm* — Ralph E Smith (57) ABSTRACT

A method of performing a double swap kickdown shift in a transmission having a main box and a compounder. The compounder is shifted during the hold speed phase of the downshift. The target ratio for the downshift is overshot by an overshoot RPM.

20 Claims, 5 Drawing Sheets

FIG. 1

| GEAR | CLUTCHES APPLIED | | | | | | | |
|---|---|---|---|---|---|---|---|---|
| | A | B | C | D | E | F | G | H |
| 1 | X | | | | X | X | | X |
| 2 | X | | | | X | | X | |
| 3 | X | | | X | | X | | X |
| 4 | X | X | | | | X | | X |
| 4' | X | | | X | | | X | |
| 5 | X | X | | | | | X | |
| 6 | | X | | X | | | X | |
| R | | | X | | X | X | | |

DOUBLE SWAP KICKDOWN SHIFT CONTROL

FIELD

The present disclosure relates to a method for controlling an automatic transmission equipped with a main box and a compounder box, and more specifically to a method for shifting an automatic transmission equipped with a main box and a compounder box.

BACKGROUND

A typical automatic transmission includes a plurality of planetary gear sets and a plurality of clutches that selectively route torque among the gear sets and through the automatic transmission. The transmission is capable of achieving a plurality of gear ratios by applying or releasing the plurality of clutches to alter the torque path through the transmission. Typically, shifts within the automatic transmission are sequential. Thus, to pass from the lowest to the highest transmission gear ratio, all intermediate gear ratios must be passed through in order from lowest to highest.

Shifts in a typical automatic transmission are accomplished by a process known as "single swap" up-shifting or down-shifting. In a single swap shift, a first clutch is released and a second clutch is applied. Typically, no other clutches are manipulated during the shift. Alternatively, a gear change may be accomplished with a "double swap" up-shift or down-shift. In a double swap shift, two clutches are released and two different clutches are applied. Double swap shifts allow the use of gear ratios that might not be otherwise available using a single swap shift. However, typical double swap shifts also present certain disadvantages. The transmission control logic utilized for typical double swap shifts is such that the actual timing of the completed shift is unpredictable. Thus, the shift may be completed earlier or later than desired causing a rapid change in output torque and resulting in a rough shift and a jerky ride for vehicle occupants. Further, typical double swap shift logic may result in a slow shift wasting energy within the transmission, wearing the clutches, and reducing vehicle performance. Therefore improvement in the art is desirable.

SUMMARY

In one form, the present disclosure provides a method for performing a double swap downshift from a first gear ratio to a second, lower gear ratio in a transmission having a main box and a compounder box coupled to the main box. The main box includes a first plurality of clutches coupled to a transmission input shaft and the compounder box includes a second plurality of clutches coupled to a compounder main shaft. The transmission has a target ratio at which the transmission input shaft rotates relative to the compounder main shaft when operating in the lower gear ratio. The method includes fully releasing a first clutch of the second plurality of clutches and partially applying a second clutch of the second plurality of clutches. The method also includes partially releasing a first clutch of the first plurality of clutches, and then modulating the release of the first clutch of the first plurality of clutches, thereby, permitting the first clutch of the first plurality of clutches to slip at a rate such that the RPM of the transmission input shaft exceed the target ratio by a predetermined overshoot amount. The method further includes fully applying the second clutch of the second plurality of clutches, and then partially applying a second clutch of the first plurality of clutches. The method also includes modulating the release of the first clutch of the first plurality of clutches, thereby, permitting the first clutch of the first plurality of clutches to slip at a rate such that the RPM of the main box exceeds the RPM of the compounder box by a predetermined overshoot amount. The method also includes fully applying the second clutch of the first plurality of clutches, and then fully releasing the first clutch of the first plurality of clutches.

In another form, the present disclosure provides a method for performing a double swap downshift from a first gear ratio to a lower gear ratio in a transmission having a main box and a compounder box coupled to the main box. The main box includes a first clutch, a second clutch, a third clutch, a fourth clutch and a fifth clutch coupled to a transmission input shaft. The compounder box includes a sixth clutch and a seventh clutch coupled to a compounder main shaft. The transmission has a target ratio at which the transmission input shaft rotates relative to the compounder main shaft when operating in the lower gear ratio. The method includes fully releasing the sixth clutch and partially applying the seventh clutch, and then partially releasing the fourth clutch. The method also includes modulating the release of the fourth clutch, thereby, permitting the fourth clutch to slip at a rate such that the RPM of the transmission input shaft exceed the target ratio by a predetermined overshoot amount, and then fully applying the seventh clutch. The method further includes partially applying the fifth clutch, followed by fully applying the fifth clutch, and then fully releasing the fourth clutch Thus, a method for controlling a vehicle automatic transmission equipped with a main gear box and an underdrive assembly is provided. The method improves shift quality while also improving shift speed and performance. The method minimizes clutch energy and, thereby, improves clutch durability.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
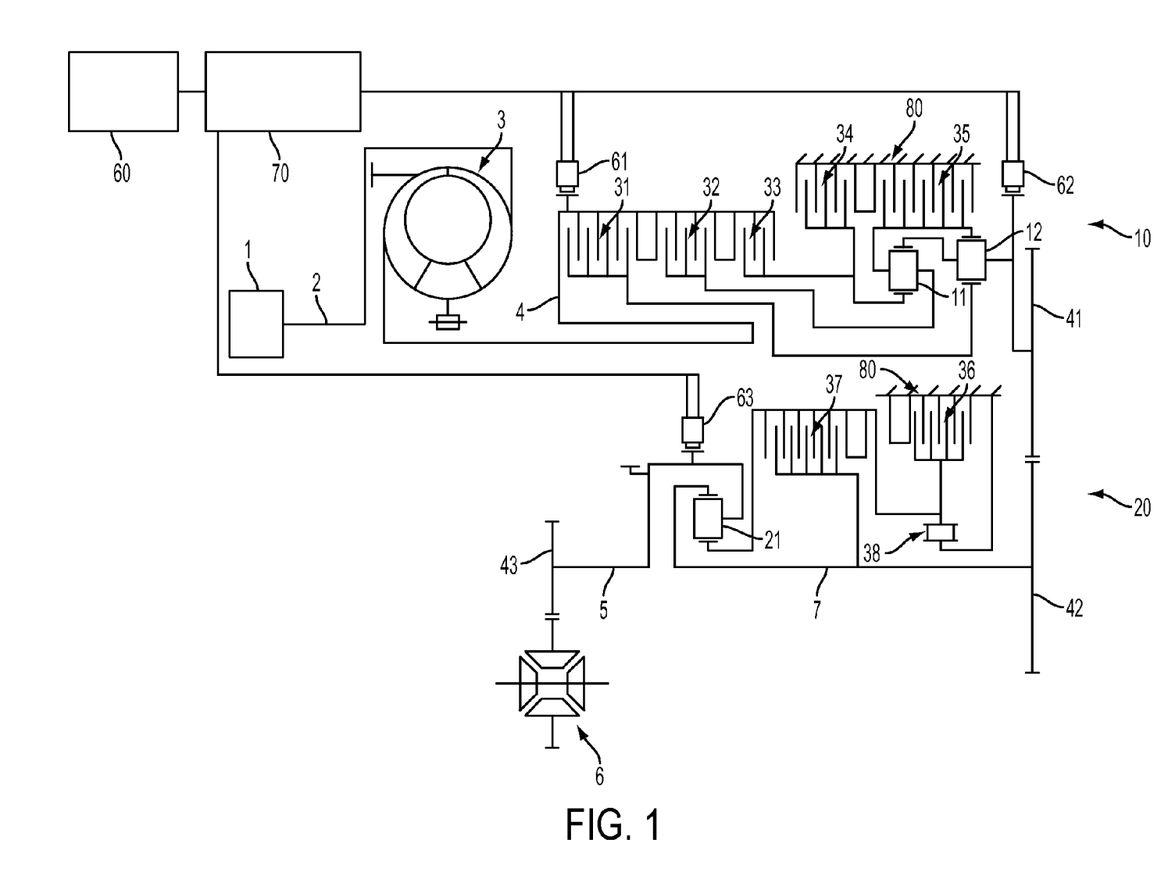
FIG. 1 is a schematic representation of an exemplary transmission according to the principles of the present disclosure.

FIG. 1 is a schematic representation of an exemplary transmission according to the principles of the present disclosure. The transmission includes an engine 1 coupled to an input shaft 2. The engine 1 may be any power source including, but not limited to, an internal combustion engine, electric motor, hydraulic motor, or any other type of power source. The input shaft 2 is coupled to a torque converter 3. The torque converter 3 may be any type of torque transmission device or torque converter. It is desirable to have capability, such as control logic, for a double swap shift that produces a consistent and substantially smooth and predictable shift, thereby improving both subjective and objective shift quality. Control logic that reduces shift time and, thereby, minimizes energy losses and clutch wear while improving vehicle performance is also desirable The transmission further includes a main box 10 including a first clutch mechanism 31 ("clutch A"), second clutch mechanism 32 ("clutch B"), third clutch mechanism 33 ("clutch C"), fourth clutch mechanism 34 ("clutch D"), fifth clutch mechanism 35 ("clutch E"), a first planetary gear set 11 and a second planetary gear set 12. The torque converter 3 is coupled by a transmission input shaft 4 coupled to clutch A 31, clutch B 32, and clutch C 33. In one embodiment, the input shaft 2 is coupled directly to the transmission input shaft 4, and the torque converter 3 is omitted. In one embodiment, the input shaft 2 is coupled directly to clutch A 31, clutch B 32, and clutch C 33, and the torque converter 3 is omitted. Clutch A 31 selectively couples the transmission input shaft 4 to a sun gear of the second planetary gear set 12. Clutch B 32 selectively couples the transmission input shaft 4 to a carrier of a first planetary gear set 11. Clutch C 33 selectively couples the transmission input shaft 4 to a sun gear of the first planetary gear set 11 and to clutch D 34. Clutch D 34 selectively couples the sun gear of the first planetary gear set 11 to the transmission housing 80. The carrier of the first planetary gear set 11 is coupled to a ring gear of the second planetary gear set 12. Clutch E 35 selectively couples the carrier of the first planetary gear set 11 and the ring gear of the second planetary gear set 12 to the transmission housing 80. A ring gear of the first planetary gear set 11 is coupled to a carrier of the second planetary gear set 12. The carrier of the second planetary gear set 12 is coupled to a main box output gear 41 continuously meshed with a compounder box input gear 42.

The transmission also includes a compounder box 20 including a sixth clutch mechanism 36 ("clutch F"), a seventh clutch mechanism 37 ("clutch G"), an overrunning clutch 38 ("clutch H"), and a third planetary gear set 21. The compounder box input gear 42 is coupled to a ring gear of a third planetary gear set 21 by a compounder main shaft 7. A sun gear of the third planetary gear set 21 is coupled to clutch F 36 and clutch G 37. Clutch F 36 selectively couples the sun gear of the third planetary gear set 21 to the transmission housing 80. Clutch G 37 selectively couples the sun gear of the third planetary gear set 21 to the ring gear of the third planetary gear set 21 and the compounder box input gear 42, thereby, locking together all elements of the third planetary gear set 21 and forcing the components to rotate synchronously. The sun gear of the third planetary gear set 21 is also coupled to clutch H 38. Clutch H 38 may be any type of overrunning or one-way clutch or any device that permits rotation between respective parts coupled to it in a first direction but not in a second direction. Clutch H 38 is coupled to the transmission housing 80 and permits rotation of the sun gear of the third planetary gear set 21 with respect to the transmission housing 80 in a first direction of rotation but not in a second direction of rotation. Thus, clutch H 38 is not an actively controlled clutch and need not be controlled during shifts. In one embodiment, clutch H 38 may be an actively controlled clutch that selectively couples the sun gear of the third planetary gear set 21 to the transmission housing 80.

A carrier of the third planetary gear set 21 is coupled to an output shaft 5. The output shaft 5 is coupled to an output gear 43 coupled to a differential 6 to distribute power to the vehicle's wheels.

The transmission also includes a transmission controller 70 for controlling the function of the transmission including the engagement and release of the clutches A 31, B 32, C 33, D 34, E 35, F 36, G 37. The transmission may include an input speed sensor 61 that monitors the rotational speed of the transmission input shaft 4 ("input speed"), a transfer speed sensor 62 that monitors the rotational speed of the output from the main box 10 (in one embodiment the rotational speed of the main box output gear 41) ("main box output gear speed"), and an output speed sensor 63 that monitors the rotational speed of the output shaft 5 ("output shaft speed"). In one embodiment, the rotational speed of the transmission input shaft 4 roughly approximates the rotational speed of the torque convertor 3. The sensors 61, 62, 63 may be any type of sensor capable of measuring rotational speed. In one embodiment, the sensors 61, 62, 63 measure rotational speed as rotations per minute ("RPM"). The sensors 61, 62, 63 are in communication with a transmission controller 70 and provide the transmission controller 70 with RPM data for each of the transmission input shaft 4, main box output gear 41, and output shaft 5. Additional vehicle sensors 60 are also in communication with the transmission controller 70 and report data regarding vehicle operating conditions and performance to the transmission controller 70. Additional vehicle sensors may include, but are not limited to, a throttle-angle sensor, brake sensor, and vehicle speed sensor.

The transmission controller 70 controls the engagement or release of the clutches A 31, B 32, C 33, D 34, E 35, F 36, G 37 to selectively achieve different gear ratios in the main box 10, compounder box 20, and overall transmission to obtain the optimum overall gear ratio for the vehicle operating conditions. The transmission controller 70 may compare current operating conditions of the transmission, as determined by the sensors 61, 62, 63, with data received from other vehicle sensors 60 to determine an optimum transmission gear ratio. The transmission controller 70 may then adjust the engagement and release of the clutches A 31, B 32, C 33, D 34, E 35, F 36, G 37 to achieve the optimum transmission gear ratio.

Figure 2:
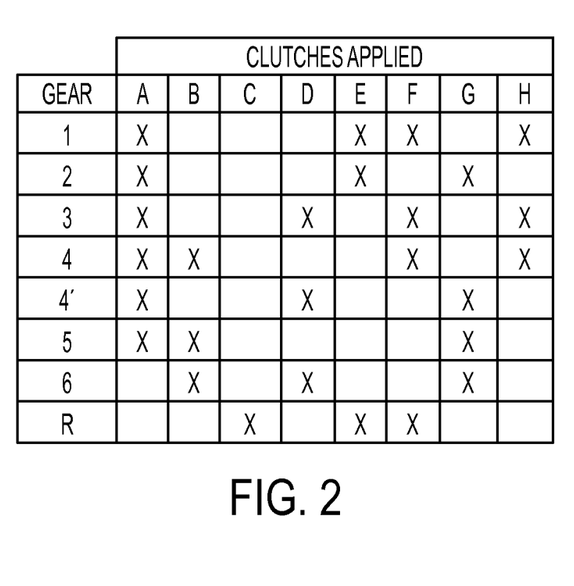
FIG. 2 is a table showing gear ratio combinations and shift sequences for the transmission of FIG. 1.

FIG. 2 is a table showing gear ratio combinations and shift sequences for the transmission of FIG. 1. With reference to FIGS. 1 and 2, the clutches A 31 ("A"), B 32 ("B"), C 33 ("C"), D 34 ("D"), E 35 ("E"), F 36 ("F"), G 37 ("G") may be selectively applied and released as shown in FIG. 2 to achieve a plurality of transmission gears ratios. An "X" in FIG. 2 indicates that the respective clutch A 31, B 32, C 33, D 34, E 35, F 36, G 37, is engaged, thereby locking together those components to which it is coupled. With respect to clutch H 38, an "X" indicates that the clutch H 38 is actively preventing rotation in the first direction.

To operate the transmission in a first gear ratio ("1"), clutch A 31, clutch E 35 and clutch F 36 are engaged, clutch H 38 is preventing rotation in the first direction, and clutch B 32, clutch C 33, clutch D 34 and clutch G 37 are released. To operate the transmission in a second gear ratio ("2"), clutch A 31, clutch E 35 and clutch G 37 are engaged, clutch H 38 is permitting rotation in the second direction and clutch B 32, clutch C 33, clutch D 34 and clutch F 36 are released. To operate the transmission in a third gear ratio ("3"), clutch A 31, clutch D 34 and clutch F 36 are engaged, clutch H 38 is preventing rotation in the first direction, and clutch B 32, clutch C 33, clutch E 35 and clutch G 37 are released. To operate the transmission in a fourth gear ratio ("4"), clutch A 31, clutch B 32 and clutch F 36 are engaged, clutch H 38 is preventing rotation in the first direction, and clutch C 33, clutch D 34, clutch E 35 and clutch G 37 are released. To operate the transmission in a fourth prime gear ratio ("4"), clutch A 31, clutch D 34 and clutch G 37 are engaged, clutch H 38 is permitting rotation in the second direction, and clutch B 32, clutch C 33, clutch E 35 and clutch F 36 are released. To operate the transmission in a fifth gear ratio ("5"), clutch A 31, clutch B 32 and clutch G 37 are engaged, clutch H 38 is permitting rotation in the second direction, and clutch C 33, clutch D 34, clutch E 35 and clutch F 36 are released. To operate the transmission in a sixth gear ratio ("6"), clutch B 32, clutch D 34 and clutch G 37 are engaged, clutch H 38 is permitting rotation in the second direction, and clutch A 31, clutch C 33, clutch E 35 and clutch F 36 are released. To operate the transmission in a reverse gear ratio ("R"), clutch C 33, clutch E 35 and clutch F 36 are engaged, clutch H 38 is permitting rotation in the second direction, and clutch A 31, clutch B 32, clutch D 34 and clutch G 37 are released. The transmission controller 70 receives signals generated by the input speed sensor 61 (input speed), the transfer speed sensor 62 (main box output gear speed), and the output speed sensor 63 (output shaft speed), and vehicle sensors 60 and selects the proper gear depending on vehicle conditions by engaging/releasing the associated clutches A 31, B 32, C 33, D 34, E 35, F 36, G 37.

With reference to FIGS. 1 and 2, the shift from operation in a third gear ratio ("3") to operation in a second gear ratio ("2") requires releasing clutch D 34 in the main box 10 and releasing clutch F 36 in the compounder box 20. The shift also requires engaging clutch E 35 in the main box 10 and engaging clutch G 37 in the compounder box 20. Thus, the downshift from the third gear ratio to the second gear ratio is a double swap kickdown shift ("downshift").

Figure 3:
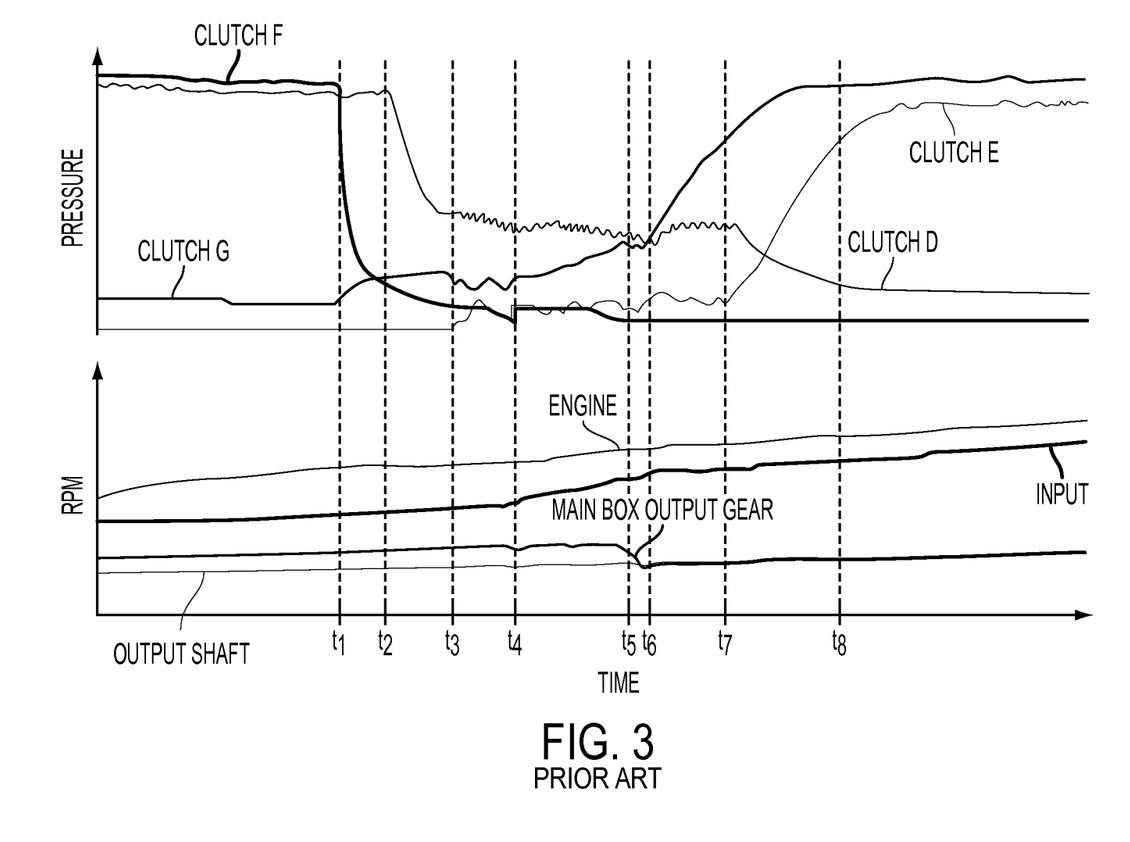
FIG. 3 is a graph depicting clutch pressure and component RPM during a double swap kickdown shift from a third gear ratio to a second gear ratio in the transmission of FIG. 1 performed in accordance with the prior art.

FIG. 3 is a graph depicting clutch pressure and component RPM during a double swap kickdown shift from a third gear ratio to a second gear ratio in the transmission of FIG. 1 performed in accordance with the prior art. Referring to FIG. 3, in an exemplary prior art double swap downshift at time $t_1$, the transmission controller 70 deenergizes the solenoid supply valve (not shown) controlling the application pressure of clutch F 36. The transmission controller 70 also energizes the solenoid supply valve controlling the application pressure of clutch G 37 to prepare clutch G 37 for application. At time $t_2$, clutch G 37 is prepared for application, and the transmission controller 70 deenergizes the solenoid supply valve controlling clutch D 34, thereby, rapidly decreasing the application pressure of clutch D 34 until a desired pressure is achieved at time $t_3$. Typically, the desired application pressure of clutch D 34 at this point of the shift is a pressure sufficient to prevent clutch D 34 from slipping. The transmission controller 70 then energizes the solenoid supply valve controlling clutch D 34, to reduce the application pressure of clutch D 34 and permit clutch D 34 to begin slipping. Also at time $t_3$, the transmission controller 70 energizes the solenoid supply valve controlling the application pressure of clutch E 35 so as to prepare clutch E 35 for application.

At time $t_4$, an RPM change begins to occur in the main box 10. At this point, the compounder box 20 enters a torque-phase duty cycle mode in which the transmission controller 70 begins to slowly increase the duty cycle of the solenoid supply valve controlling clutch G 37, to prepare clutch G 37 for application. The transmission controller 70 typically operates in an open loop mode to prepare the clutches for application until the compounder box 20 begins to slip.

At time $t_5$, with the main box 10 slipping, and as the compounder box 20 begins to slip, the transmission controller 70 enters a main box 10 "hold speed" mode in which the transmission controller 70 energizes the solenoid supply valve controlling the application pressure of clutch D 34 such that an approximately constant amount of torque is transmitted through clutch D 34. At the same time, the transmission controller 70 drops the duty cycle for the solenoid supply valve controlling the application pressure of clutch G 37 to an inertial phase, wherein the transmission controller 70 achieves a compounder "constant flow" mode to maintain the application pressure of clutch G 37 at a pressure at which the compounder box 20 slips.

At time $t_6$, when the RPM of the output shaft 5 equals the RPM of the compounder main shaft 7, the transmission controller 70 fully energizes the solenoid supply valve controlling clutch G 37, thereby, fully applying clutch G 37. Shortly thereafter, at time $t_7$, once clutch G 37 is fully applied, the transmission controller 70 fully energizes clutch E 35 and deenergizes clutch D 34, thereby, completing the double swap downshift at time $t_8$. In one embodiment, the main box output gear 41 RPM and compounder box 20 RPM are identical.

Figure 4A:
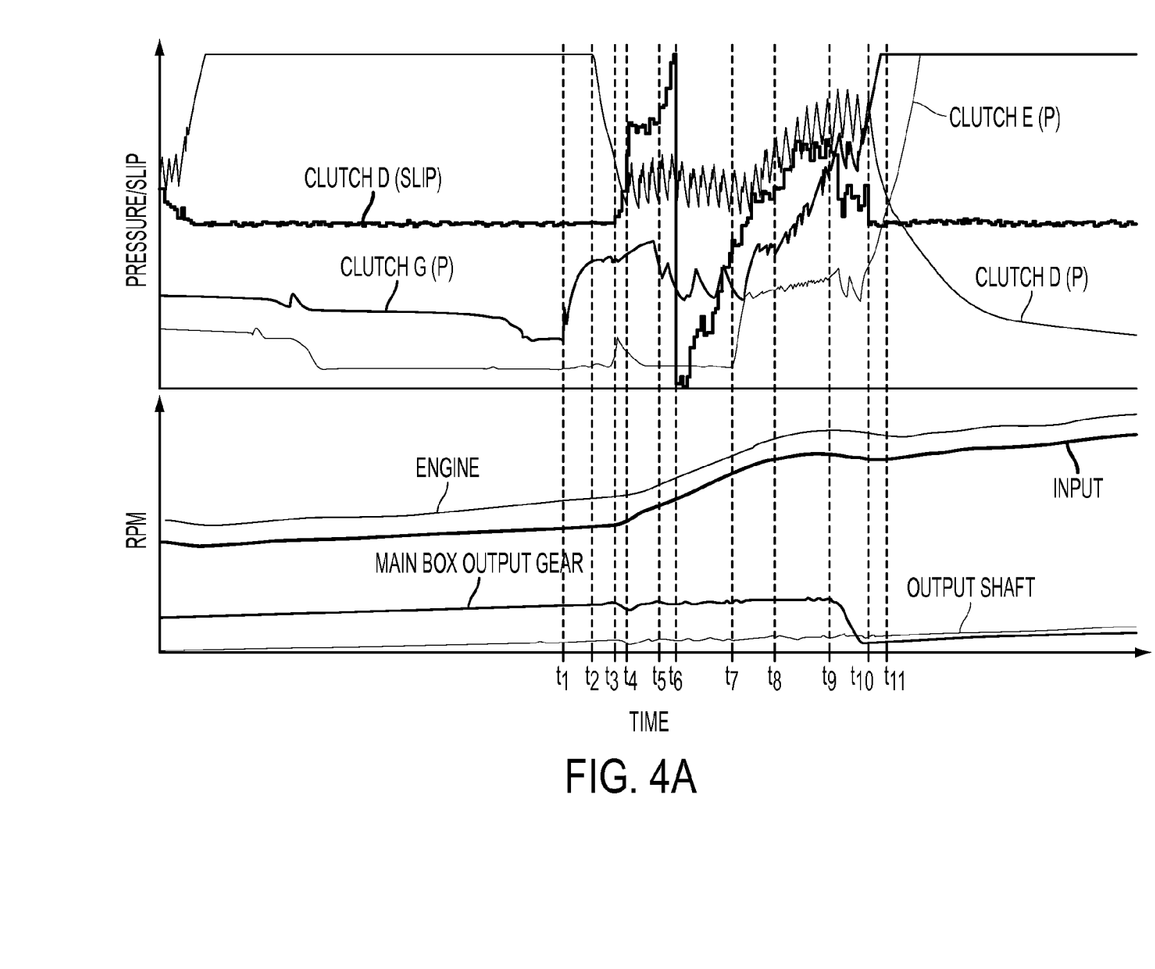
FIG. 4A is a graph depicting clutch pressure, clutch slip, and component RPM during a double swap kickdown shift from a third gear ratio to a second gear ratio in the transmission of FIG. 1 performed in accordance with an aspect disclosed herein.

FIG. 4A is an example graph depicting clutch pressure and component RPM during a double swap kickdown shift from a third gear ratio to a second gear ratio in the transmission of FIG. 1 performed in accordance with an aspect disclosed herein. At time $t_1$, the transmission controller 70 initially deenergizes a solenoid supply valve (not shown) controlling application pressure of clutch F 36. The transmission controller 70 also energizes a solenoid supply valve controlling the application pressure of clutch G 37 to prepare clutch G 37 for application. By time $t_2$, clutch G 37 has been prepared for application and the transmission controller 70 deenergizes the solenoid supply valve controlling the application pressure of clutch D 34, thereby, rapidly decreasing the application pressure of clutch D 34. The application pressure of clutch D 34 is decreased until time $t_3$ at which a desired application pressure of clutch D 34 is achieved. By time $t_3$, the decrease in the application pressure of clutch D 34 has begun to allow clutch D 34 to slip. This marks the start of the RPM change of the components of the transmission. The transmission controller 70 energizes the solenoid supply valve to control the slippage of clutch D 34 to provide sufficient torque transmission capability to allow the transmission to remain in gear providing propulsion.

Clutch D 34 slips at an increasing rotations per minute until time $t_4$ at which time the main box 10 and compounder box 20 enter the "input phase" of the shift. When operated in the second gear ratio, the main box 10 operates at a particular ratio of RPM compared to the compounder box 20. During the change speed phase of a prior art double swap 3-2 downshift, the input speed (RPM of the transmission input shaft 4) is typically operated at a target acceleration. However, during a double swap 3-2 downshift according to the principles of the present disclosure, the input speed is a predetermined number of RPM greater than a target ratio during the hold speed phase of the double swap 3-2 downshift. The target ratio is the RPM ratio of the input speed to the output shaft speed when the transmission is operated in the second gear ratio. Thus, the input speed overshoots the target ratio as the clutch D 34 is permitted to slip. In one embodiment, the input speed overshoots the target ratio by any amount of RPM greater than 0. In a preferred embodiment, the input speed is approximately 50 RPM greater than the target ratio RPM. In another embodiment, the input speed is approximately 100 RPM greater than the target ratio RPM. Between times $t_3$ and $t_{11}$, the solenoid supply valve controlling pressure to clutch D 34 modulates the application pressure of clutch D 34 to maintain a desired rate of acceleration of the input speed to the transmission.

At time $t_5$, once the acceleration rate of the input speed is steady, the transmission controller 70 begins to fully energize the solenoid supply valve controlling clutch G 37, thereby, locking clutch G 37 by time $t_6$. Thus, the shift in the compounder box 20 is completed during the hold speed phase of the transmission shift. As a result, the overshoot of the slipping of clutch D 34 is reduced to the target ratio.

Figure 4B:
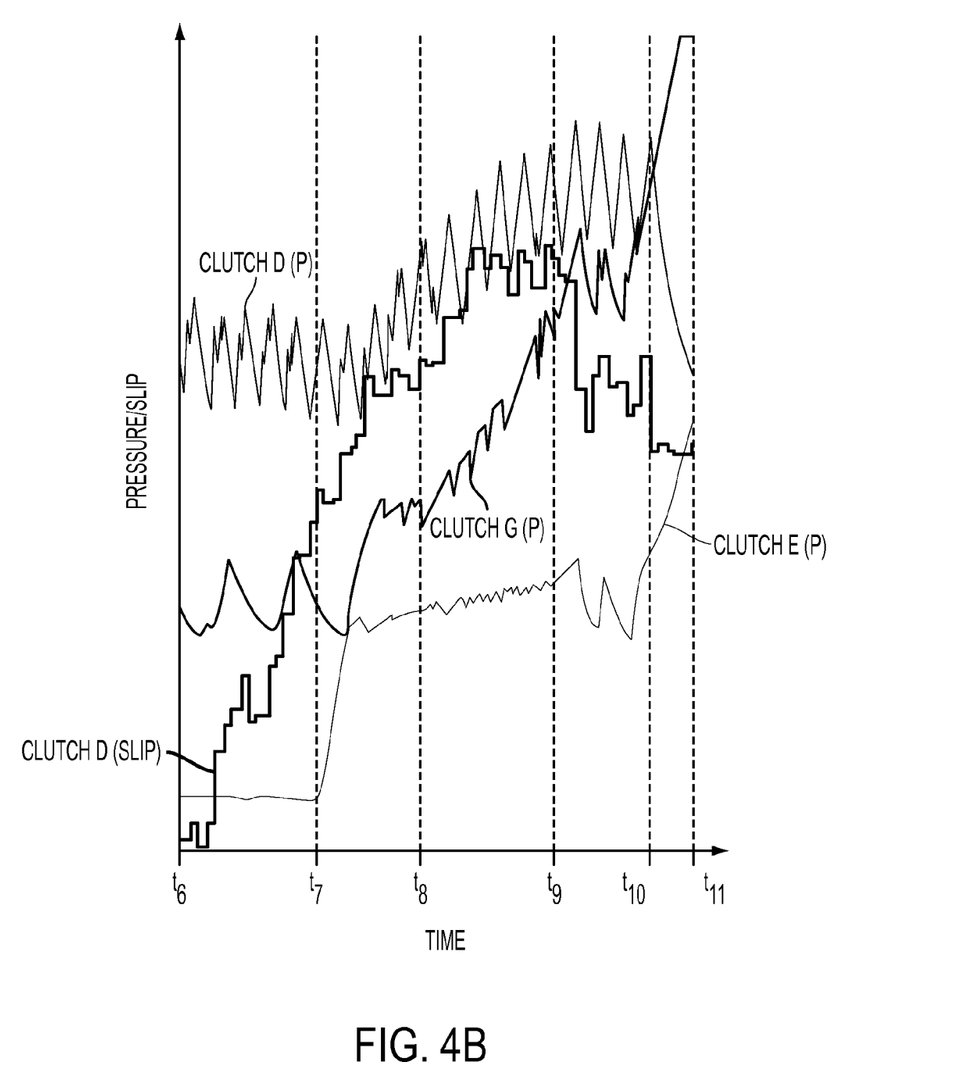
FIG. 4B is an enlarged view of a portion of the graph of FIG. 4A.

FIG. 4B is an enlarged view of a portion of the graph of FIG. 4A. With reference to FIGS. 4A and 4B, at time $t_7$, the transmission controller 70 energizes a solenoid supply valve controlling the application pressure of clutch E 35 to prepare clutch E 35 for application. The transmission controller 70 continues to modulate the solenoid supply valve controlling clutch D 34, slightly increasing the application pressure of clutch D 34 at $t_8$ and causing the input speed to return to a desired overshoot condition of the target ratio by $t_9$.

At time $t_9$, an RPM change begins to occur in the main box 10. At time $t_{10}$, the transmission controller 70 energizes the solenoid supply valve controlling the application pressure of clutch E 35 and locks clutch E 35. At time $t_{11}$, the transmission controller 70 deenergizes the solenoid supply valve controlling the application pressure of clutch D 34, thereby, fully releasing clutch D 34 and completing the shift. In one embodiment, the main box output gear 41 RPM and compounder box 20 RPM are identical.

It should be understood that the layout of the clutches A 31, B 32, C 33, D 34, E 35, F 36, G 37 and planetary gear sets 11, 12, 21 is for exemplary purposes only and any number and arrangement of clutches A 31, B 32, C 33, D 34, E 35, F 36, G 37 and planetary gear sets 11, 12, 21 may be utilized. In addition, while the method of performing the double swap downshift was described with reference to a downshift from a third gear ratio to a second gear ratio, the method may be utilized for any double swap downshift. To perform a double swap downshift to a different gear ratio, the appropriate clutches must be substituted for those described above.

In one embodiment, the clutches A 31, B 32, C 33, D 34, E 35, F 36, G 37 may be multi-plate clutches, wet clutches, dry clutches, dog clutches, or any other desired type of clutching device. A typical dog clutch requires the RPM of the two components to be coupled to be within a certain range of one another in order to permit the dog clutch to couple the first component to the second component. In one embodiment, the RPM difference between the two components is less than +/−200 RPM. In another embodiment, the RPM difference between the two components is less than +/−50 RPM. In another embodiment, the RPM difference between the two components may be greater than +/−200 RPM. In one embodiment where dog clutches are used, between times $t_4$ and $t_6$, the overshoot RPM is maintained below the maximum RPM difference at which dog clutch G 37 can successfully couple the sun gear of the third planetary gear set 21 to the ring gear of the third planetary gear set 21 and the compounder box input gear 42. The overshoot RPM is maintained during the entire application process of the dog clutch G 37.

Thus, a method for controlling a vehicle automatic transmission equipped with both a main box 10 and a compounder box 20 is provided. The method produces a consistently smooth and predictable shift, thereby, improving both subjective and objective shift quality. The method reduces shift time and, thereby, minimizes energy losses and clutch wear while improving vehicle performance.

What is claimed is:

1. A method of performing a double swap downshift from a first gear ratio to a second, lower gear ratio in a transmission having a main box and a compounder box coupled to the main box, the main box having a first plurality of clutches coupled to a transmission input shaft, and the compounder box having a second plurality of clutches coupled to a compounder main shaft, the transmission having a target ratio at which said transmission input shaft rotates relative to said compounder main shaft when operating in said lower gear ratio, the method comprising:

fully releasing a first clutch of said second plurality of clutches and partially applying a second clutch of said second plurality of clutches;

partially releasing a first clutch of said first plurality of clutches;

modulating the release of said first clutch of said first plurality of clutches, thereby, permitting said first clutch of said first plurality of clutches to slip at a rate such that the rotations per minute (RPM) of said transmission input shaft exceed the target ratio by a predetermined overshoot amount;

fully applying said second clutch of said second plurality of clutches;

partially applying a second clutch of said first plurality of clutches;

fully applying said second clutch of said first plurality of clutches; and fully releasing said first clutch of said first plurality of clutches.

2. The method of claim 1, wherein said predetermined overshoot amount is at least 50 RPM.

3. The method of claim 1, wherein said predetermined overshoot amount is at least 100 RPM.

4. The method of claim 2, wherein said first clutch of said second plurality of clutches selectively couples a sun gear of a third planetary gear set to a transmission housing, a carrier of said third planetary gear set is coupled to an output shaft, and a ring gear of said third planetary gear set is coupled to said compounder main shaft, and wherein fully releasing said first clutch of said second plurality of clutches permits said sun gear of said third planetary gear set to rotate with respect to said transmission housing.

5. The method of claim 2, wherein said second clutch of said second plurality of clutches selectively couples a sun gear of a third planetary gear set to said compounder main shaft, and wherein partially applying said second clutch of said second plurality of clutches permits said sun gear of said third planetary gear set to slip relative to said compounder main shaft and fully applying said second clutch of said second plurality of clutches locks said sun gear of said third planetary gear set to said compounder main shaft.

6. The method of claim 2, wherein said first clutch of said first plurality of clutches selectively couples a sun gear of a first planetary gear set to a transmission housing, and wherein partially releasing said first clutch of said first plurality of clutches permits said sun gear of said first planetary gear set to slip relative to said transmission housing and fully releasing said first clutch of said first plurality of clutches permits said sun gear of said first planetary gear set to rotate relative to said transmission housing.

7. The method of claim 6, wherein a third clutch of said first plurality of clutches selectively couples said transmission input shaft to a sun gear of a second planetary gear set, a fourth clutch of said first plurality of clutches selectively couples said transmission input shaft to a carrier of said first planetary gear set, and a fifth clutch of said first plurality of clutches selectively couples said transmission input shaft to said sun gear of said first planetary gear set, and wherein said third clutch of said first plurality of clutches is fully applied during said double swap downshift.

8. The method of claim 2, wherein said second clutch of said first plurality of clutches selectively couples a carrier of a first planetary gear set and a ring gear of a second planetary gear set to a transmission housing, and wherein partially applying said second clutch of said first plurality of clutches permits said carrier of said first planetary gear set and said ring gear of said second planetary gear set to slip relative to said transmission housing and fully applying said second clutch of said first plurality of clutches locks said carrier of said first planetary gear set and said ring gear of said second planetary gear set to said transmission housing.

9. The method of claim 8, wherein a third clutch of said first plurality of clutches selectively couples said transmission input shaft to a sun gear of said second planetary gear set, a fourth clutch of said first plurality of clutches selectively couples said transmission input shaft to said carrier of said first planetary gear set, and a fifth clutch of said first plurality of clutches selectively couples said transmission input shaft to a sun gear of said first planetary gear set, and wherein said third clutch of said first plurality of clutches is fully applied during said double swap downshift.

10. A method of performing a double swap downshift from a first gear ratio to a lower gear ratio in a transmission having a main box and a compounder box coupled to the main box, the main box having a first clutch, a second clutch, a third clutch, a fourth clutch and a fifth clutch coupled to a transmission input shaft, and the compounder box having a sixth clutch and a seventh clutch coupled to a compounder main shaft, the transmission having a target ratio at which said transmission input shaft rotates relative to said compounder main shaft when operating in said lower gear ratio, the method comprising, in series, the steps of:
fully releasing said sixth clutch and partially applying said seventh clutch;
partially releasing said fourth clutch;
modulating the release of said fourth clutch, thereby, permitting said fourth clutch to slip at a rate such that the rotations per minute (RPM) of said transmission input shaft exceed the target ratio by a predetermined overshoot amount;
fully applying said seventh clutch;
partially applying said fifth clutch;
fully applying said fifth clutch; and
fully releasing said fourth clutch.

11. The method of claim 10, wherein said predetermined overshoot amount is at least 50 RPM.

12. The method of claim 10, wherein said predetermined overshoot amount is at least 100 RPM.

13. The method of claim 10, wherein said sixth clutch selectively couples a sun gear of a third planetary gear set to a transmission housing, a carrier of said third planetary gear set is coupled to an output shaft, and a ring gear of said third planetary gear set is coupled to said compounder main shaft, and wherein fully releasing said sixth clutch permits said sun gear of said third planetary gear set to rotate with respect to said transmission housing.

14. The method of claim 10, wherein said seventh clutch selectively couples a sun gear of a third planetary gear set to said compounder main shaft, and wherein partially applying said seventh clutch permits said sun gear of said third planetary gear set to slip relative to said compounder main shaft and fully applying said seventh clutch locks said sun gear of said third planetary gear set to said compounder main shaft.

15. The method of claim 10, wherein said fourth clutch selectively couples a sun gear of a first planetary gear set to a transmission housing, and wherein partially releasing said fourth clutch permits said sun gear of said first planetary gear set to slip relative to said transmission housing and fully releasing said fourth clutch permits said sun gear of said first planetary gear set to rotate relative to said transmission housing.

16. The method of claim 15, wherein said first clutch selectively couples said transmission input shaft to a sun gear of a second planetary gear set, said second clutch selectively couples said transmission input shaft to a carrier of said first planetary gear set, and said third clutch selectively couples said transmission input shaft to said sun gear of said first planetary gear set, and wherein said first clutch is fully applied during said double swap downshift.

17. The method of claim 10, wherein said fifth clutch selectively couples a carrier of a first planetary gear set and a ring gear of a second planetary gear set to a transmission housing, and wherein partially applying said fifth clutch permits said carrier of said first planetary gear set and said ring gear of said second planetary gear set to slip relative to said transmission housing and fully applying said fifth clutch locks said carrier of said first planetary gear set and said ring gear of said second planetary gear set to said transmission housing.

18. The method of claim 17, wherein said first clutch selectively couples said transmission input shaft to a sun gear of said second planetary gear set, said second clutch selectively couples said transmission input shaft to said carrier of said first planetary gear set, and said third clutch of said first plurality of clutches selectively couples said transmission input shaft to a sun gear of said first planetary gear set, and wherein said first clutch is fully applied during said double swap downshift.

19. The method of claim 13, wherein said predetermined overshoot amount is at least 50 RPM.

20. The method of claim 17, wherein said predetermined overshoot amount is at least 50 RPM.

\* \* \* \* \*